United States Patent [19]
Devall et al.

[11] Patent Number: 5,694,968
[45] Date of Patent: Dec. 9, 1997

[54] TANK VENTING CONTROL SYSTEM

[75] Inventors: Jeffrey E. Devall, Liberty; Lowell R. Bell; Robert S. Harris, both of Connersville, all of Ind.

[73] Assignee: Stant Manufacturing Inc., Connersville, Ind.

[21] Appl. No.: 634,903

[22] Filed: Apr. 15, 1996

[51] Int. Cl.⁶ .................................. F16K 24/04
[52] U.S. Cl. .......................... 137/202; 137/43
[58] Field of Search ........................ 137/43, 202

[56] References Cited

U.S. PATENT DOCUMENTS

| | | |
|---|---|---|
| 4,666,058 | 5/1987 | Harris .................... 137/43 X |
| 4,760,858 | 8/1988 | Szlaga . |
| 4,816,045 | 3/1989 | Szlaga et al. . |
| 4,974,645 | 12/1990 | Johnson . |
| 4,991,615 | 2/1991 | Szlaga et al. . |
| 5,028,244 | 7/1991 | Szlaga . |
| 5,044,389 | 9/1991 | Gimby .................... 137/43 X |
| 5,065,782 | 11/1991 | Szlaga . |
| 5,156,178 | 10/1992 | Harris . |
| 5,215,132 | 6/1993 | Kobayashi . |
| 5,234,013 | 8/1993 | Roetker et al. . |
| 5,261,439 | 11/1993 | Harris . |
| 5,318,069 | 6/1994 | Harris . |
| 5,439,023 | 8/1995 | Horikawa ................ 137/43 X |
| 5,449,029 | 9/1995 | Harris ..................... 137/202 X |

Primary Examiner—Gerald A. Michalsky
Attorney, Agent, or Firm—Barnes & Thornburg

[57] ABSTRACT

An apparatus is provided for controlling discharge of fuel vapor from an interior region of a vehicle fuel tank and preventing unsatisfactory liquid fill levels within the interior region of the vehicle fuel tank. The apparatus includes a housing adapted to be mounted in the vehicle fuel tank and formed to include a housing inlet, a vapor-inlet opening, and a passageway therebetween, a float valve disposed in the housing, and a skirt defining a channel around the float valve. Additionally a perforated baffle plate is coupled to the skirt and is formed to include a plurality of openings therethrough.

43 Claims, 8 Drawing Sheets

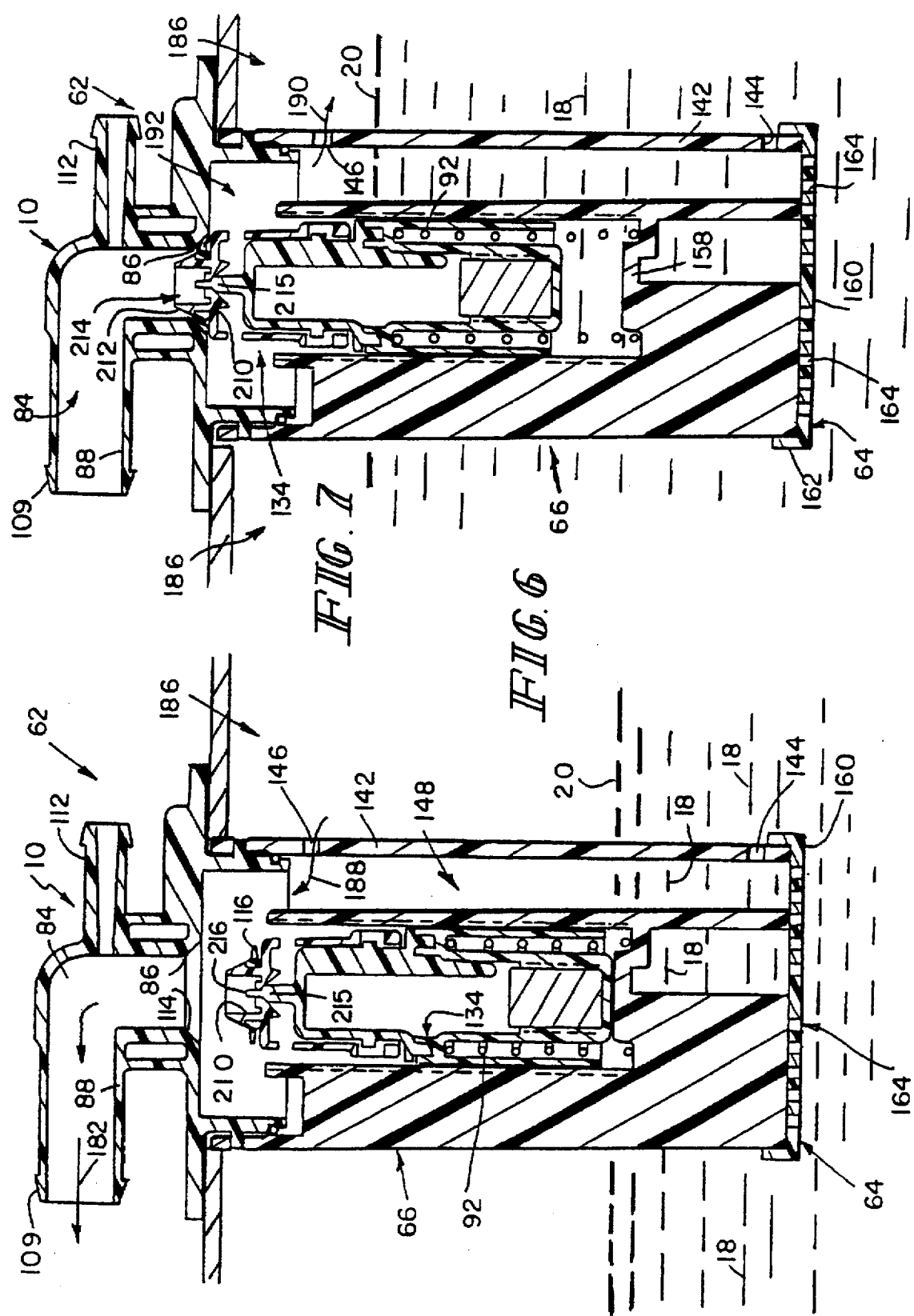

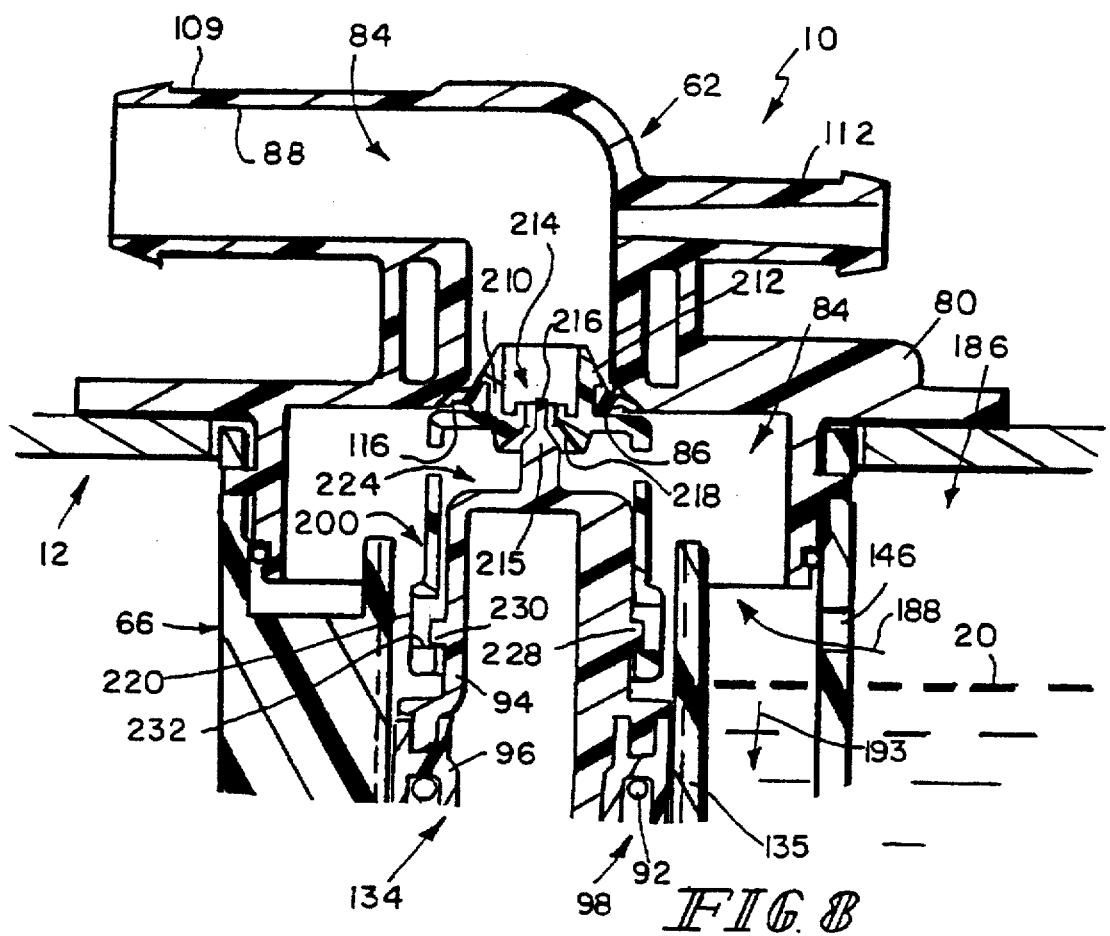

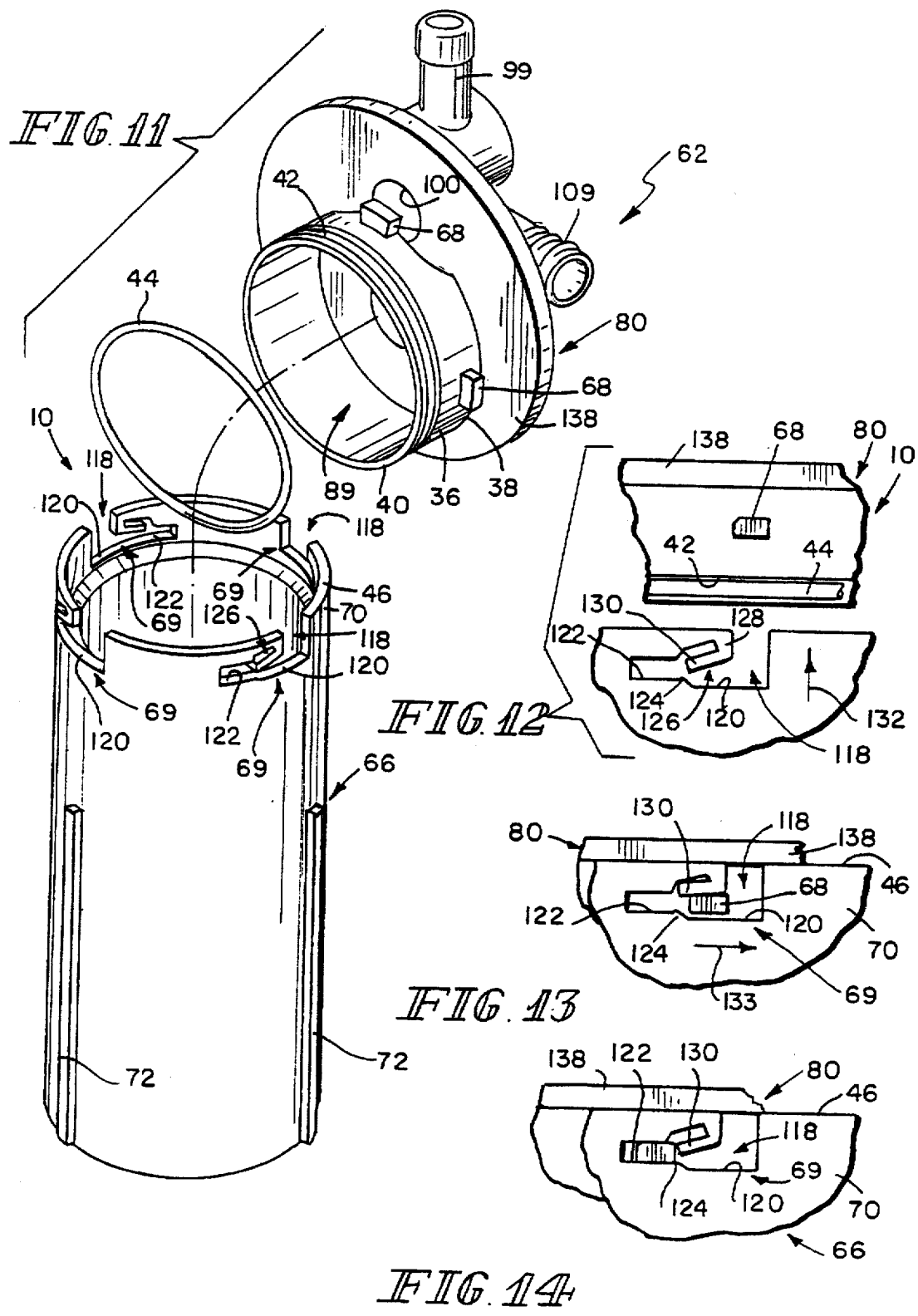

TANK VENTING CONTROL SYSTEM

BACKGROUND AND SUMMARY OF THE INVENTION

The present invention relates to systems for controlling venting of fuel vapors from a vehicle fuel tank, and particularly to a venting apparatus that operates to seal the vapor space in the interior of a fuel tank during refueling and reopens at some point after refueling has been completed to vent the vapor space. More particularly, the present invention relates to a refueling ventilation and fill-limit system for controlling tank ventilation and for preventing overfilling of a fuel tank.

Management of fuel vapor on-board a vehicle is an important part of modern vehicle fuel system design. A tank venting control assembly for selectively discharging fuel vapor pressure in response to the development of high tank pressure conditions and for introducing air into the fuel tank in response to the development of vacuum conditions therein is disclosed, for example, in U.S. Pat. No. 5,234,013 to Roetker et al.

Fuel vapor can be created in the fuel tank by temperature differences between the fuel tank and liquid fuel from a fuel pump, as well as by sloshing and agitation of the fuel tank during normal vehicle operation. The pressure buildup resulting from the creation of new fuel vapors must be relieved properly. For this reason, many vehicle fuel systems are equipped with tank venting control assemblies capable of discharging a relatively large amount of fuel vapor in response to the development of high pressure conditions in the fuel tank.

It is well understood that significant quantities of fuel vapor can escape from a fuel tank through the filler neck to the atmosphere during the refueling of motor vehicles. Early attempts to control the vapor escape focused upon control devices fitted to a fuel-dispensing pump nozzle connected to a service station fuel pump. Later, control devices mounted directly on-board the vehicle (and thus referred to as "On-Board Refueling Vapor Recovery" systems or "ORVR" systems) were developed. See, for example, U.S. Pat. No. 4,816,045 to Szlaga et al., relating to a vapor-recovery system mounted on the fuel tank filler neck. ORVR systems that mount to a fuel tank have also been developed as shown, for example, in U.S. Pat. No. 5,156,178 to Harris.

In addition to controlling vapor escape, well-designed ORVR systems also assist in controlling the amount of liquid fuel that can be pumped into the fuel tank during refueling. For safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically and temporarily shut the pump nozzle off. To assist in preventing tank overfill under such conditions, an ORVR system is usually provided with a "fill-limit" control system that assists in triggering the nozzle shut-off mechanism when the level of liquid fuel in the fuel tank has risen to a predetermined level. See, for example, the fill-limit control systems disclosed in U.S. Pat. No. 4,816,045 to Szlaga et al and U.S. Pat. No. 5,449,029 to Harris.

It has also long been recognized that fuel vapor is generated in the fuel tank during vehicle operation, for example, when the liquid fuel evaporates or sloshes against the walls of the tank. Excessive pressure can build up in the fuel tank as a result of the newly formed fuel vapor unless control devices are provided to vent the fuel vapor from the fuel tank during vehicle operation. Such valves have been referred to as "run-loss" valves or tank-venting control valves because they handle fuel vapor loss during vehicle run and are capable of preventing liquid fuel carryover during vehicle rollover.

Fuel pump nozzles are known to include a fill-limiting sensor for shutting off the flow of fuel from the nozzle when the fuel tank is nearly filled. Typically, this fill-limiting sensor is triggered whenever the fuel tank is full and fuel "backs up" the filler neck to splash onto or reach the fill-limiting sensor located on the nozzle. Sometimes fuel pump operators overfill a fuel tank inadvertently in a good-faith effort to fill the tank "completely" or to purchase a quantity of fuel that can be paid for in cash without causing the operator to receive unwanted coinage in change.

It has been observed that fuel pump operators are able to manually override or bypass some fill-limiting sensors on nozzles by continuing to pump fuel after the pump nozzle has automatically shut off several times. This practice has come to be called the "trickle-fill" method of introducing liquid fuel into a fuel tank. Using this well-known trickle-fill method, the fuel pump operator "clicks" or squeezes the lever handle on the pump nozzle slowly two or three times in succession after automatic nozzle shutoff has occurred in order to introduce more fuel into the fuel tank without actuating the fill-limiting sensor right away. It will be appreciated that such trickle-fill practices can result in overfilling the fuel tank that can effectively reduce the fuel vapor expansion capacity in the vapor space available within the filled fuel tank.

Vehicle fuel systems are known to include valves for venting the vapor space in a fuel tank. See, for example, U.S. Pat. Nos. 4,760,858; 4,991,615; 5,028,244; and 5,449,029.

What is needed is a fill-limit and tank-ventilation control system that is easy to assemble and is able to vent fuel vapor from the vapor space in a fuel tank during early stages of refueling. This control system should also block introduction of any and all liquid fuel in excess of a maximum volume so as to preserve a minimum volume of the vapor space in the fuel tank once the fuel tank is filled to its maximum capacity with fuel. Ideally, this fill-limit and tank-ventilation control system could be included as a snap-on component in a comprehensive On-Board Refueling Vapor Recovery (ORVR) vehicle fuel system. An ORVR system is used to manage fuel vapor recovery during all phases of vehicle use. In addition, a fill-limit control system that is adaptable to permit customers some latitude to trickle-fill their fuel tanks without overfilling the fuel tanks would be welcomed by fuel customers and vehicle makers.

It will be understood that each vehicle has a custom-designed fuel tank sized and shaped to mount onto a particular vehicle underbody. That being the case, one can begin to understand why a single fill-limit and tank-ventilation valve assembly might not be of the proper size to fit into every custom-designed vehicle fuel tank. It will be understood that certain "tall" (i.e., vertical height) valves do not fit well in small-capacity, compact vehicle fuel tanks characterized by short vertical height. Few vehicle manufacturers wish to carry in inventory a separate float valve assembly for each manufactured vehicle. What is needed is a modular fill-limit and tank-ventilation float valve assembly that can be adapted easily to fit into a wide variety of vehicle fuel tanks.

Vehicle manufacturers would welcome a modular fill-limit and tank-ventilation valve assembly. Such a modular assembly could be assembled using a series of standardized parts to produce various valve assemblies and produce a "customized" valve assembly sized to fit properly in a particular size and shaped vehicle fuel tank. In such a system, all components including valves and the baffle plate would be standardized and other modular components would be used to connect the standardized valve components together so as to establish a customized vertical height for each modular fill-limit and tank-ventilation valve assembly. System costs could be further minimized and manufacturing schedules could be improved if such a modular float-valve assembly could be configured.

According to the present invention, a venting control system is provided for controlling fuel vapor discharge from a vehicle fuel tank. The venting control system includes a vent apparatus mountable in an aperture formed in a top wall of the fuel tank. The vent apparatus is formed to include a vapor-inlet opening communicating with an interior region of the fuel tank, a vapor-outlet opening, and a passageway interconnecting the vapor-inlet opening and the vapor-outlet opening. The system further includes a tubular skirt having an uppermost end coupled to the vent apparatus and a lowermost end arranged to extend downwardly away from the vent apparatus and a perforated baffle plate coupled to the lowermost end of the tubular skirt. The tubular skirt and the baffle plate are positioned to lie in the interior region of the fuel tank when the vent apparatus is mounted in the top wall aperture of the fuel tank.

In preferred embodiments, pressurized fuel vapor in a fuel tank carrying a venting control system in accordance with the present invention is vented from the fuel tank to a vapor-recovery canister or other destination through channels and passageways formed in the tubular skirt and the vent apparatus. In preferred embodiments, the vent apparatus includes a pressure-relief and vacuum-relief valve assembly and a rollover valve assembly for regulating fuel vapor, air, and liquid fuel flow into and out of the fuel tank through the venting control system.

Also in preferred embodiments, the lowermost end of the tubular skirt is formed to include a skirt inlet for admitting pressurized fuel vapor and liquid fuel from the fuel tank into a channel formed in the tubular skirt. The perforated baffle plate is coupled to the lowermost end of the tubular skirt and configured to control pressurized fuel vapor and liquid fuel flow from the fuel tank into the tubular skirt channel.

The perforated baffle plate is mounted on a lowermost end of the tubular skirt to substantially prevent rising liquid fuel within the tank from suddenly entering the channel of the skirt. Liquid fuel, however, does enter and rise within the channel. A buoyant float valve is moved by rising liquid fuel in the fuel tank to its closed position at a late stage during tank refueling to block gross passage of liquid fuel into the channel formed in the tubular skirt through the skirt inlet. Thus, the float valve functions to prevent liquid fuel from exiting the fuel tank through the tubular skirt and the vent apparatus in the venting control system in accordance with the present invention during refueling.

Another aspect of the present invention is that the venting control system illustratively includes snap-connected modular components. This modular venting control system comprises a standardized vent apparatus, a standardized perforated baffle plate, and tubular skirts having many different lengths. In use, a venting control system sized to fit in a particular custom-designed fuel tank can be made by interconnecting the standardized vent apparatus and baffle plate using a tubular skirt having an appropriate length. Assembly of these modular parts is made easy by using a connector to couple the uppermost end of the tubular skirt to the overlying vent apparatus and a snap-on perforated baffle plate that couples to the lowermost end of the tubular skirt.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a view similar to FIGS. 2 and 4 showing closure of the lower side wall aperture formed in the tubular skirt at a point in time after the liquid fuel level inside the fuel tank has risen to its 100% full level and showing continued venting of pressurized fuel vapor in the vapor space of the fuel tank to the vapor recovery canister through the upper side wall aperture formed in the tubular skirt;

FIG. 7 is a view similar to FIGS. 2, 4, and 6 showing that if a pump operator continues to add more and more liquid fuel into the filler neck using the trickle-fill technique, the level of liquid fuel in a channel formed in the tubular skirt will ultimately rise to a point high enough to apply a buoyancy force to a rollover float valve included in the rollover valve assembly and suspended in the channel formed in the tubular skirt to move the rollover float valve to a position closing a passage to the vapor recovery canister;

FIG. 8 is an enlarged view similar to FIGS. 2, 4, 6, and showing drainage of some of the liquid fuel from the channel formed in the tubular skirt into the fuel tank about thirty seconds after the movement shown in FIG. 7 and movement of a solid closure member of the rollover float valve away from a valve seat to oven a bypass passageway;

FIG. 11 is an exploded side elevational view of a fill-limit and tank-ventilation valve showing a tubular skirt having four connector portions situated at an uppermost end, an o-ring, and a vent apparatus having a cylindrical wall formed to retain the o-ring thereon and having spaced-apart connectors positioned thereabout;

FIG. 12 is an enlarged side view of one connector on the vent apparatus and one connector portion formed in the tubular skirt and showing the connector portion including a notch inlet, a sliding passageway, a locking portion, and a locking unit positioned in a connector-disengaging position;

FIG. 13 is a view similar to FIG. 12 showing the connector positioned in the sliding passageway of the connector portion and loading a living spring of the locking unit; and FIG. 14 is a view similar to FIG. 13 showing the connector positioned in the locking portion and showing the living spring unloaded and preventing the connector from reentering the sliding passageway.

DETAILED DESCRIPTION OF THE DRAWINGS

Figure 1:
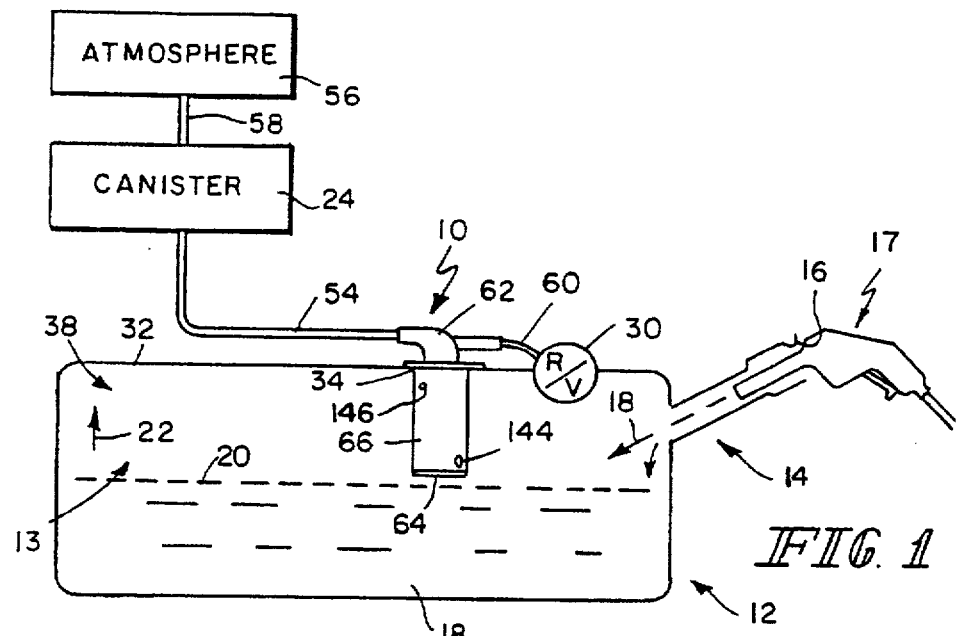
FIG. 1 is a diagrammatic illustration of a tank venting system in accordance with the present invention coupled to a fuel tank unit, the system including a fill-limit and tank-ventilation valve having a perforated baffle plate mounted thereon, a run-loss valve mounted on a top wall of the fuel tank unit, and a vapor recovery canister coupled via a tube to the fill-limit and tank-ventilation valve.

A presently preferred embodiment of an On-board Refueling Vapor Recovery (ORVR) fuel system is shown in FIG. 1. A fill-limit and tank-ventilation valve 10 in accordance with the present invention is included in this system and is mounted as shown in a fuel tank 12 having an interior region 13, a filler neck 14, and a top wall 32. Fill-limit and tank-ventilation valve 10 is mounted in an aperture 34 for valve 10 in the tank top wall 32.

Filler neck 14 has a mouth 16 for receiving a fuel-dispensing pump nozzle 17 during refueling. This nozzle 17 is used by a pump operator to introduce liquid fuel 18 into interior region 13 of fuel tank 12 during refueling. As fuel tank 12 is filled during refueling, a top surface 20 of liquid fuel 18 will rise in direction 22 as shown in FIG. 1. Normally, a removable cap (not shown) is used to close the mouth 16 of filler neck 14.

The ORVR system also includes a vapor-recovery canister 24, such as, for example, a charcoal-filled canister, designed to capture and store fuel vapors that are generated and displaced in the fuel tank 12 during a typical vehicle refueling operation. The ORVR system also illustratively includes a run-loss or other vent valve 30 mounted in the top wall 32 of fuel tank 12. Run-loss or vent valve 30 is provided to regulate liquid fuel and fuel vapor discharge from fuel tank 12. Reference is hereby made to U.S. Pat. No. 5,028,244 to Szlaga, and U.S. Pat. No. 5,065,782 to Szlaga, which patents are incorporated by reference herein, for descriptions of a suitable run-loss valve.

As shown in FIG. 1, pressurized fuel vapor can be discharged from fill-limit valve 10 to vapor-recovery canister 24 through a tube 54 and on to an atmosphere 56 through a tube 58. Also, pressurized fuel vapor can be discharged from run-loss valve 30 through a tube 60 to fill-limit valve 10 and on to the vapor-recovery canister 24 through tube 54 and the atmosphere 56 through tube 58. Further in certain cases, fuel vapor can be discharged from fill-limit valve 10 directly to atmosphere (not shown).

Figure 2:
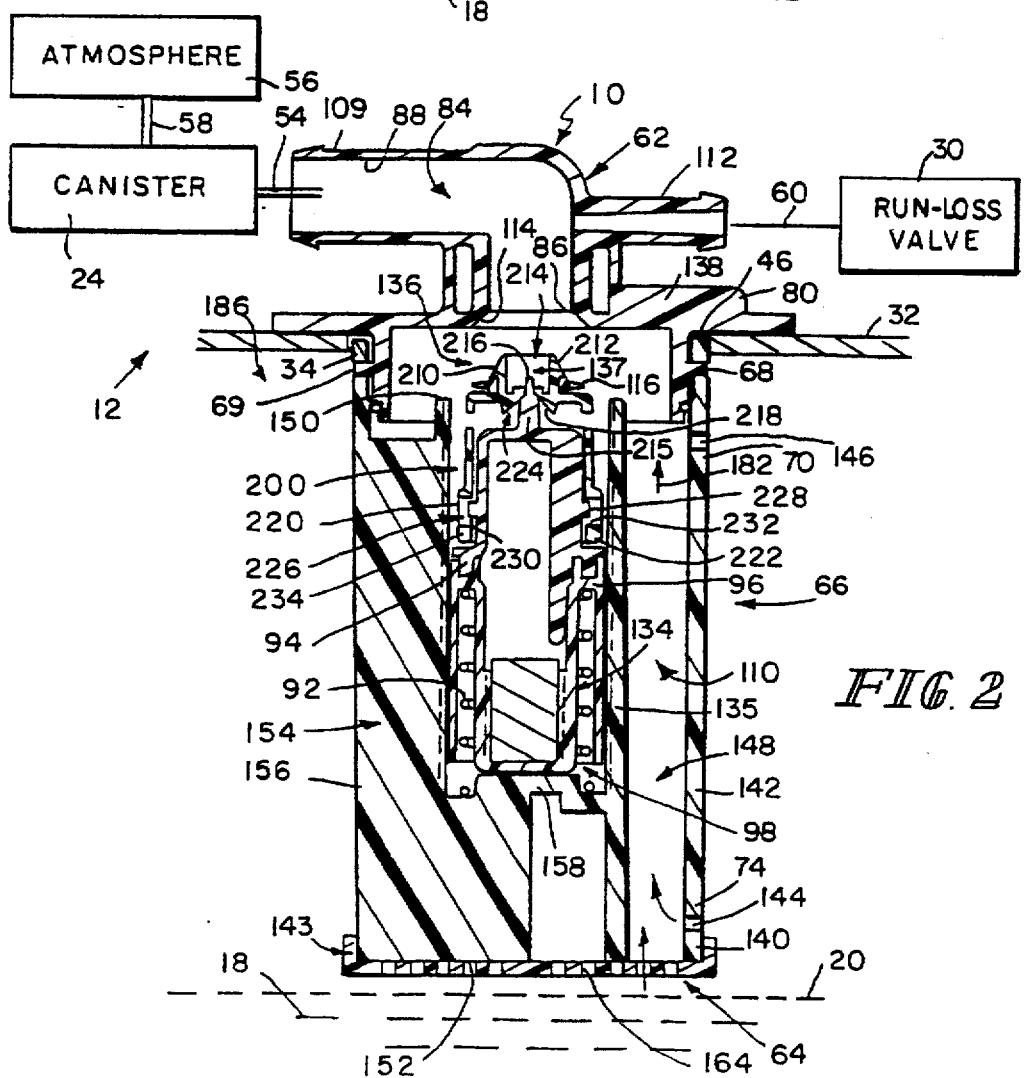
FIG. 2 is an enlarged transverse sectional detail view of the fill-limit and tank-ventilation valve of FIG. 1 mounted to the top wall of the fuel tank showing a tubular skirt around a rollover valve assembly and the perforated baffle plate mounted on the tubular skirt and showing venting of fuel vapor from a vapor space in the fuel tank during refueling through the perforations in the baffle plate.

Referring now to FIG. 2, in a preferred embodiment fill-limit valve 10 is an assembly of modular components. Fill-limit valve 10 includes a vent apparatus 62, a perforated baffle plate 64, and an elongated tubular skirt 66 interconnecting vent apparatus 62 and baffle plate 64. This perforated baffle plate 64 acts as an easy-to-assemble, one-piece, fill-limit control system. The baffle plate 64 includes no moving parts, is relatively flat, and may be snap-fit onto a lower end of the skirt 66.

The tubular skirt 66 shown in FIG. 2 has a set of first connector portions 69 to couple an uppermost end 70 of tubular skirt 66 to overlying vent apparatus 62. The connector portions 69 of the skirt 66, however, permit the vent apparatus 62 and baffle plate 64 to be interchangeable with skirts 66 of different lengths. As such, it is possible to change the effective height (see FIG. 1) of fill-limit valve 10 inside fuel tank 12 simply by interconnecting vent apparatus 62 and underlying baffle plate 64 using the modular tubular skirt 66 or the like. Further the relatively flat baffle plate 64 permits the fill-limit valve 10 to be fit into a wide variety of compact fuel tanks 12 having a relatively short vertical height.

The baffle plate 64 may serve as a fill-limit control system on a variety of fill-limit and tank-ventilation systems. One preferred valve 10 is illustrated in FIGS. 2 and 4-7. This valve 10 includes the vent apparatus 62 that controls fuel vapor venting through aperture 34 in fuel tank 12. Vent apparatus 62 is designed to be mounted in the aperture 34 formed in the top wall 32 as shown, for example, in FIG. 2. Vent apparatus 62 includes a valve housing 80. Housing 80 is formed to include a partition 138 having a valve seat 114 that defines a vapor-inlet opening 86 therethrough. In addition, the housing 80 includes a housing inlet 87 and a wall 91 defining a passageway 89 extending between the housing inlet 87 and the valve seat 114. Housing 80 also includes a vapor-outlet opening 88 interconnected in fluid communication with the vapor-inlet opening 86 by a passageway 84. Typically the vapor-outlet opening 88 is connected to the fuel vapor treatment device 24. It is understood that a variety of venting control assemblies may be positioned within passageway 84, as shown, for example, in FIG. 10.

Figure 4:
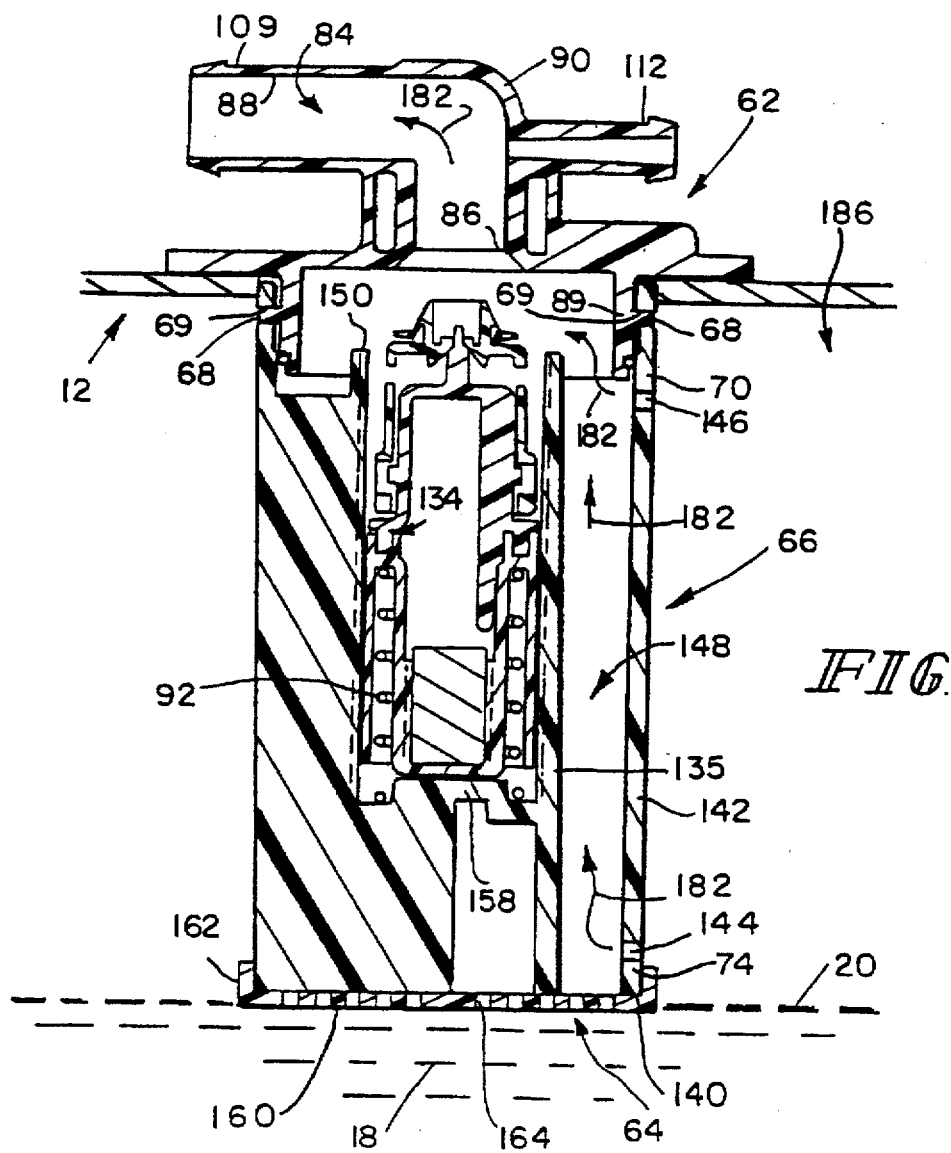
FIG. 4 is a view similar to FIG. 2 showing the flow of fuel vapor through the tubular skirt once the liquid fuel level in the tank rises to reach the perforated baffle plate that substantially blocks flow of liquid fuel and fuel vapor therethrough, the venting of some pressurized fuel vapor vents from the fuel tank to the vapor recovery canister through upper and lower side wall apertures formed in the tubular skirt.

Valve housing 80 of vent apparatus 62 is formed to include a hollow interior that is divided into a lower chamber 89 and an upper chamber 90 defined by passageway 84 as shown, for example, in FIG. 4. Upper chamber 90 of valve housing 80 is formed to include a first outlet 109 defining the vapor-outlet opening 88 and a second outlet 99 at a right angle to the first outlet 109, see FIG. 11. Partition 138 includes an opening 100 therethrough that is in vapor-flow communication with second outlet 99. First outlet 109 is coupled to vapor-recovery canister 24 and second outlet 99 discharges excess fuel vapor to the atmosphere. Valve housing 80 also includes an inlet 112 for communicating pressurized fuel vapor discharged from run-loss valve 30 through tube 60 into the valve housing 80. Valve housing 80 is thus a part of two vent paths for pressurized fuel vapor being discharged from fuel tank 12 to vapor-recovery canister 24. Pressurized fuel vapor can pass from fuel tank 12 to vapor-recovery canister 24 along one path through vapor-inlet opening 86 in valve housing 80 or along another path through inlet 112 in valve housing 80.

Baffle plate 64 may operate in conjunction with a fill-limit and tank-ventilation valve 10 having a rollover valve assembly 110. Although any of a number of designs may be used, a preferred rollover valve assembly 110 is shown in FIGS. 2 and 4–7. Rollover valve assembly 110 includes a first nipple 136, a second nipple 137, a float member 134 and a rollover spring 92 arranged and movable to control liquid fuel 18 and fuel vapor discharge from the fuel tank 12 through the venting inlet aperture 86. This controlled discharge may occur in a variety of instances. For example, fuel vapor may be discharged from tank 12 as liquid fuel 18 sloshes in the fuel tank 12 during vehicle movement and when high pressure develops in the fuel tank 12. In addition, fuel vapors may be discharged from fuel tank 12 when the tank 12 is filled with liquid fuel 18 during refueling and when the fuel tank 12 tilts or is inverted during vehicle rollover. The baffle plate 64 is configured and positioned to substantially prevent sporadic and sudden flow of liquid fuel 18 against rollover valve assembly 110 during such conditions. The baffle plate 64 thus effectively regulates liquid fuel 18 flow in the skirt 66.

The float member 134 includes a top shell 94 formed to include the second nipple 137 at its upper end and a base shell 96 formed to include a downwardly opening annular cavity 98 sized to receive the coiled rollover spring 92 therein. The nipples 136, 137 are arranged and sized to block pressurized fuel vapor and also liquid fuel 18 flow through the vapor-inlet opening 86 formed in partition 138 as shown in FIG. 2. A variety of valve members are contemplated for use in accordance with the present invention, see, for example FIG. 10 and U.S. Pat. No. 5,028,244 to Szlaga, which is incorporated herein by reference.

The first nipple 136 includes a frame assembly 200 coupled to the float valve 134 to permit relative movement therebetween and a closure member 210 at its tip. The closure member 210 is appended to the frame assembly 200 to face toward the upstream valve seat 114 formed in partition 138. The closure member 210 includes an outer surface 212 configured to fit closely against the conically shaped upstream valve seat 114 so that liquid fuel 18 and fuel vapor are unable to pass between the partition 138 and the first nipple 136 upon sealing engagement of the closure member 210 and the upstream valve seat 114 as shown in FIG. 7. A gasket 116 is typically provided to ensure a sealing engagement between valve 134 and valve seat 114. The closure member 210, however, is formed to include a bypass passageway 214 extending therethrough, as shown, for example, in FIG. 8, to permit the flow of some fuel vapor into the passageway 84 through the vapor-inlet opening 86 under certain circumstances that will be discussed hereafter.

The second nipple 137 includes a solid closure member 215 having a guide 216 at its tip that faces toward a downwardly facing, conically shaped valve seat 218 formed at the inlet end of bypass passageway 214. The closure member 215 is sized and shaped to block liquid fuel 18 and vapor flow through bypass passageway 214 upon the solid closure member 215 of the second nipple 137 sealing engaging the valve seat 218 of the first nipple 136. As shown in FIGS. 6 and 7, the closure members 210, 215 of the first and second nipples 136, 137 are movable relative to the partition 138 and to each other. The nipples 136, 137 assume nested positions blocking liquid fuel 18 and fuel vapor flow through the vapor-inlet opening 86 to protect the vapor-recovery canister 24 connected to first outlet 109 of valve housing 80 from liquid fuel 18 carryover and to maintain a proper pressure head in a vapor space 186 in the fuel tank 12 during refueling.

The frame assembly 200 of the first nipple 136 includes a radially outwardly extending and axially downwardly extending side wall 220 that terminates at an annular base 222 and provides the frame assembly 200 with an inverted cup-like shape. The frame assembly 200 is formed to include an interior region 224 sized to receive the second nipple 137 therein as shown in FIG. 2. A plurality of windows 226 are formed in the side wall 220 to allow fuel vapor to pass into the interior region 224 on its way to the bypass passageway 214 (as long as the second nipple 137 is not moved to its closed position) as shown best in FIGS. 2 and 4–6.

Figure 5:
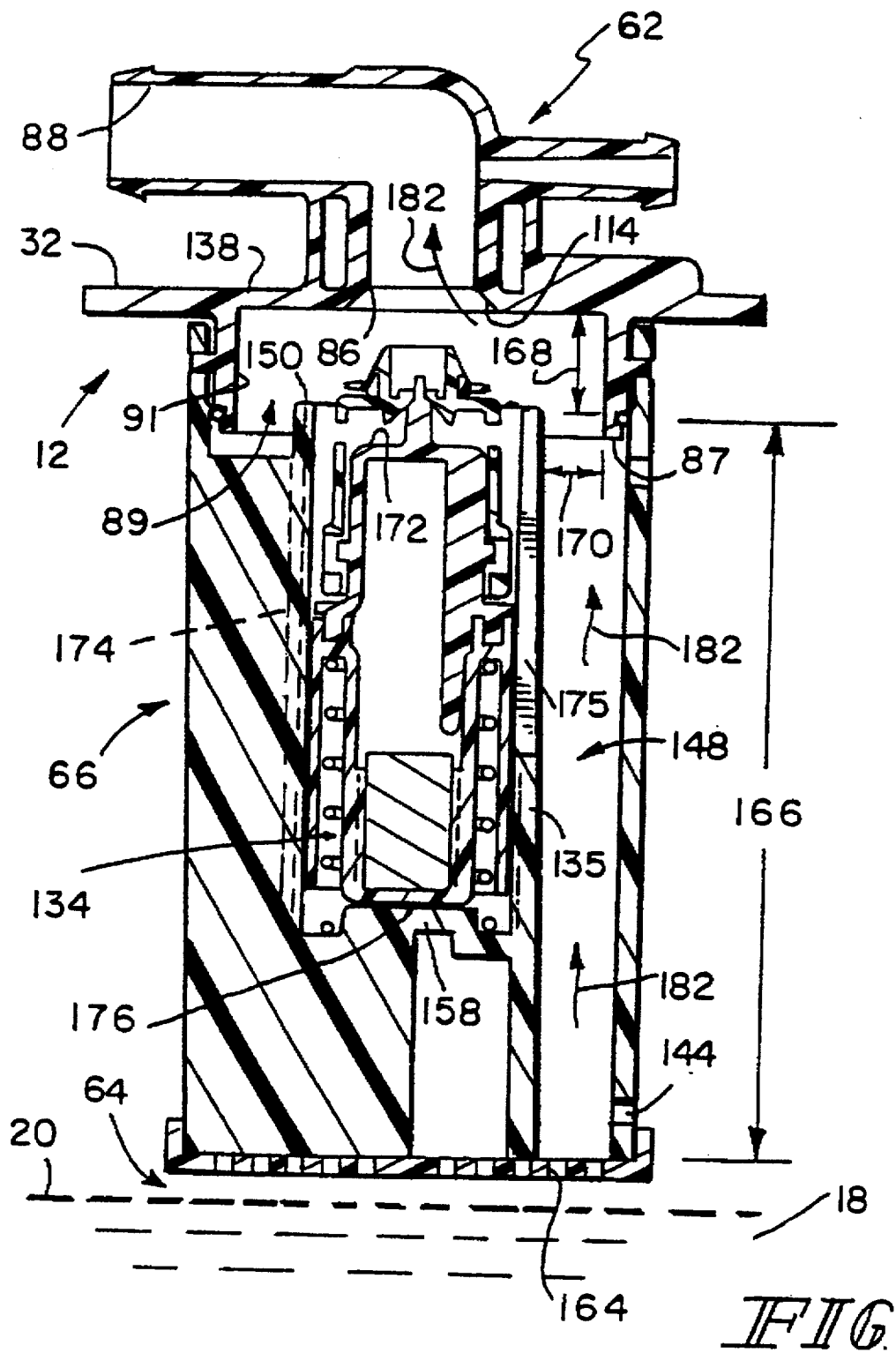
FIG. 5 is a view similar to FIG. 2 showing rising fuel vapor encountering two pressure zones within the tubular skirt.

A release flange 228 is appended to the top shell 94 of float valve 134 and arranged to lie in the interior region 224 of the frame assembly 200. The release flange 228 extends in a radially outward direction to provide a downwardly facing surface 230 that faces toward an upwardly facing surface 232 provided on a radially inwardly extending lip or arm member 234 appended to the annular base 222 of frame assembly 200. Sufficient downward movement of float valve 134 in fuel tank 12 will cause the release flange 228 to engage the lip 234 and pull the first nipple 136 away from engagement with the upstream valve seat 114, thereby opening the vapor-inlet opening 86 as shown in FIGS. 2, 4 and 5. Of course, such downward movement of the float valve 134 typically only happens when fuel 18 is not sloshing around in tank 12 and the risk of liquid fuel carryover to the vapor-recovery canister 24 is low or when the fuel level 20 in the tank 12 is being consumed in the vehicle engine (not shown) and no tank refueling is taking place.

Float-valve housing 135 is formed as a one-piece housing member. The housing 135 includes a top side 150 adjacent the lower chamber 89 of valve housing 80 and an opposite bottom side 152 adjacent the baffle plate 64. The housing 135 further includes a center portion 154. The center portion 154 includes solid partitioned members 156 positioned in spaced-apart relation to one another and a bottom plate 158 fixed therebetween. The housing 135 surrounds and supports the rollover valve assembly 110. The spring 92 is placed on the bottom plate 158 of the float-valve housing 135 to act against the base shell 96 of the float valve 134 and assist in raising float valve 134 toward its closed position against the upstream valve seat 114.

Tubular skirt 66 is formed to include a skirt inlet 140 at a lowermost end 74 of an annular side wall 142 as shown in FIG. 2. The lowermost end 74 of the skirt 66 includes a mounting section 143 to which the baffle plate 64 is coupled. Once mounted, the perforated baffle plate 64 extends across the skirt inlet 140 and covers the lowermost end 74 of the float-valve housing 135. Annular side wall 142 includes a lower side wall aperture 144 formed in lowermost end 74 and an upper side wall aperture 146 formed in uppermost end 70 as shown in FIG. 2. These apertures 144, 146 conduct fuel vapor from the fuel tank 12 into channels 148 within the tubular skirt 66 when the skirt inlet 140 is closed by liquid fuel 18 as shown, for example, in FIGS. 4 and 5. The lower side wall aperture 144 is positioned to lie between the baffle plate 64 and the float valve 134 in coextensive relation with the top surface 20 of liquid fuel 18 in the fuel tank 12 that is equal to a predetermined maximum fuel capacity in the tank 12. In addition, the upper side wall aperture 146 is positioned to lie in horizontally spaced-apart relation to the float valve 134.

The tubular skirt 66 surrounds rollover valve assembly 110 and defines the annular channel 148 therebetween.

Preferably the skirt 66 incorporates the float-valve housing 135 therein. The channels 148 are positioned between the solid partitioned members 156 and in a spaced-apart relationship. Uppermost end 70 of tubular skirt 66 includes connector portions 69 around its periphery, as shown for example in FIG. 11. These connector portions 69 are arranged to engage mating connectors 68 formed on valve housing 80. As noted previously, such a snap-connector feature facilitates assembly of a modular fill-limit valve including a snap-together vent apparatus 62.

Figure 3:
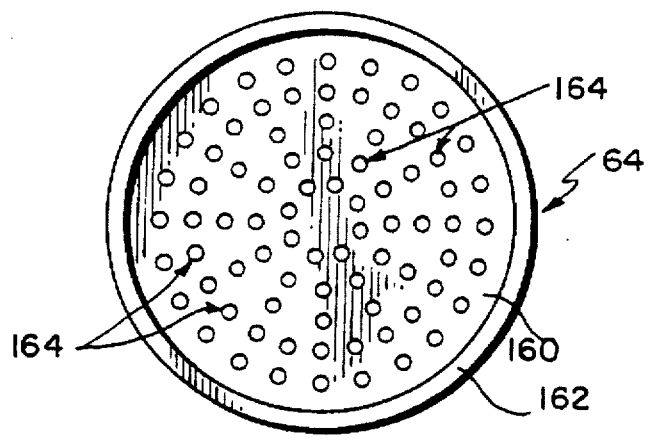
FIG. 3 is a top view of the perforated plate of FIG. 2 before it is mounted on the tubular skirt of FIG. 2.

The baffle plate 64 is securely fastened to the lowermost end 74 of the skirt 66 and extends across the skirt inlet 140. Referring now to FIG. 3, the baffle plate 64 includes a bottom wall 160 and a rim 162 extending about the circumference of said wall 160. The rim 162 is typically sized for snap-fit attachment with the mounting section 143 of the tubular skirt 66 so that the plate 64 is securely mounted adjacent the skirt inlet 140. While the plate 64 is preferably snap-fit onto the skirt 66, it is understood that screws, taps, pins, stables, adhesives, or the like may be used to couple the baffle plate 64 to the tubular skirt 66. The baffle plate may be constructed from a wide variety of materials commonly used in the manufacture of fill-limit valve assemblies.

As shown in FIG. 3, the bottom wall 160 of baffle plate 64 includes a plurality of openings 164 extending therethrough. The openings 164 in the bottom wall 160 are positioned concentrically, with each opening 164 having a diameter of about 0.050 to about 0.150 inches (about 0.127 to about 0.381 centimeters). Each opening has a diameter of approximately 0.070 inches (1.78 mm) and the wall 160 includes approximately eighty (80) openings therethrough. It is understood that the number, diameter, and pattern of the openings 164 in the bottom wall 160 may be varied so long as liquid fuel 18 flow is substantially prevented from splashing up into the channels 148. The openings 164 in the bottom wall 160 of the baffle plate 64 are sized to substantially reduce liquid fuel 18 flow therethrough.

Operational stages of fill-limit valve 10 during a typical fuel tank refueling sequence are shown in FIGS. 2 and 4–7. Initially, the fuel level 20 in fuel tank 12 is rather low as shown in FIG. 2. At relatively low fuel vapor pressure levels in fuel tank 12, little to no venting through fill-limit valve 10 is occurring.

During refueling, the top surface 20 of liquid fuel 18 rises to a point just below baffle plate 64 of fill-limit and tank-ventilation valve 10 as shown in FIG. 2. At this stage, the fuel vapor pressure level in fuel tank 12 is high enough to cause a small amount of pressurized fuel vapor to pass as shown by arrows 182 from fuel tank 12 through baffle openings 164 and lower and upper side wall aperture 144, 146 in skirt 66. Once the fuel vapor pressure level inside tank 12 exceeds a predetermined threshold level, pressurized fuel vapor vents as shown by arrows 182 in fuel tank 12 to vapor-recovery canister 24 through vapor-inlet opening 86 in partition 138, passageway 84, and vapor-outlet opening 88 in tube 109. Also, some pressurized fuel vapor 182 may vent from fuel tank 12 through valve 30 and this fuel vapor passes through inlet 112 and passageway 84 in fill-limit valve 10 on its way to vapor-recovery canister 24.

The top surface 20 of liquid fuel 20 in fuel tank 12 rises to its 95% full level as shown in FIG. 4, liquid fuel 18 engages the bottom wall 160 of the baffle plate 64. This engagement arrests displaced fuel vapor aspiration in tank 12 and blocks gross passage of liquid fuel 18 into channel 148 through skirt inlet 140 (e.g., openings 164 formed in baffle plate 64). However, pressurized fuel vapor inside vapor space 186 of fuel tank 12 can still vent to canister 24 by first passing into channel 148 in tubular skirt 66 through one or both of lower and upper side wall apertures 144, 146 as also shown in FIG. 4.

When the fuel vapor 182 enters channel 148 through openings 164 in baffle plate 64, it is situated within a first pressure zone 166, see FIG. 5. In this first zone 166 said vapor 182 encounters a first pressure drop due to the expanded volume within the channel 148. As vapor 182 rises through channel 148 it encounters restriction 170 created by the junction of the valve housing 80 and the top side 150 of the valve housing 135. This restriction increases the velocity of the vapor flow and creates an additional pressure drop in a second pressure zone 168 extending between the housing inlet 87 and the valve seat 114. This second pressure zone 168 is at an overall depression level that is a summation of the losses in pressure described above. This low pressure zone exists on an upper side 172 of the float valve 134.

Normally it is known to the art to place venting holes (not shown) in the bottom plate 158 of said float housing 135 to permit entry of liquid fuel 18 therein. The presence of liquid fuel 18 in the float housing 135 produces buoyancy and timely float valve 134 closure. There is a significant pressure difference between depression zone 168 and normal pressure external to the tank ventilation valve 10. This pressure difference can provide venting of fuel vapor through venting holes (not shown) in the bottom plate 158 and cause a pressure differential adequate to prematurely lift and close the float valve 134. This float valve 134 closure can occur without liquid pressure, resulting an unsatisfactory liquid level 20.

To reduce the tendency of such conditions, the float housing 135 suitable for use with the present invention is formed such that its bottom plate 158 and a lower 25% of its cylindrical portion 174 is solid. Slotted liquid vents 175 extend through portion 174 in a spaced apart relationship through the upper 75% of cylindrical portion 174. Float housing 135 includes three slotted liquid vents. This configuration results in a bottom 176 of the float valve 134 being exposed to the intermediate vapor pressure of the first pressure zone 166. Such exposure significantly decreases the pressure differential across the float valve 134, delaying premature float valve closure.

As shown in FIG. 6, the top surface 20 of liquid fuel 18 in fuel tank 12 has risen to its "nominal" 100% full level determined by the elevation and position of lower side wall aperture 144 within fuel tank 12. It is expected that a pump operator might have to use the trickle-fill method once or twice to raise the top surface of liquid fuel 20 in the fuel tank to this 100% full level. Reference is again made to U.S. Pat. No. 5,449,029 to Harris for a detailed description of how a skirt formed to include a side wall aperture functions to block overfilling of a fuel tank beyond a predetermined capacity. Even though liquid fuel 18 effectively "closes" lower side wall aperture 144, pressurized fuel vapor 188 in vapor space 186 of fuel tank 12 is still able to vent to channels 148 and separately to vapor-recovery canister 24 by first passing through upper side wall aperture 146 as shown in FIG. 6.

At this stage, if a pump operator continues to add more and more liquid fuel 18 into filler neck 14 using the trickle-fill technique, the liquid fuel level 20 in channel 148 formed in tubular skirt 66 will ultimately rise to a point shown in FIG. 7 that is high enough to apply a buoyancy force to rollover float valve 134 to raise float valve 134 to its closed position. In a presently preferred embodiment, this point is reached after about fifteen (15) successive overfill (i.e., trickle-fill) attempts by a pump operator. That is after a pump operator clicks or squeezes the lever handle on the pump nozzle 17 slowly about fifteen times in succession after the first automatic nozzle shut-off has occurred. Once float valve 134 is moved to its closed position as shown in FIG. 7, fuel vapor no longer passes into channel 148 and spring 92 urges valve 134 to its closed position blocking fuel vapor flow from fuel tank 12 to vapor-recovery canister 24. At this stage, no more liquid fuel 18 can be added to fuel tank 12. As also shown in FIG. 7, any pressurized fuel vapor 190 in tubular skirt vapor space 192 can vent back into lower pressure vapor space 186 in fuel tank 12 through upper side wall aperture 146 if necessary.

A short period of time (e.g., about 30 seconds) after the rollover float valve 134 moves to its closed position as shown in FIG. 7, the liquid fuel level 20 in channel 148 in tubular skirt 66 falls in direction 193 as shown in FIG. 8. Some of the liquid fuel 18 drains out through openings 164 and lower side wall aperture 144 into fuel tank 12. At this stage, pressurized fuel vapor 188 in vapor space 186 in fuel tank 12 is now free to vent through upper side wall aperture 146 to channel 148 and separately to vapor-recovery canister 24 as shown in FIG. 8. Thus, this small hole 146 in the upper portion of tubular skirt 66 functions to allow controlled pressure release from channel 148 and facilitate liquid drainage from and movement in channel 148. As soon as the fuel sloshing subsides and the risk of liquid fuel carryover to the vapor-recovery canister 24 through the venting inlet aperture 86 is reduced, the float member 134 will sink under its own weight toward its rest position shown in FIG. 2.

It has been observed that valves that are movable to engage overlying valve seats and close venting apertures formed in such valve seats have a tendency to remain in the closed position during high tank pressure because of a high pressure differential acting on such a valve. This two-nipple and bypass passageway system of the fill-limit and tank-ventilation valve 10 is designed to allow some pressurized fuel vapor to vent through bypass passageway 214 in such a way as to help unseat first nipple 136 from its nested position against upstream valve seat 114 in case first nipple 136 becomes temporarily "held" in its closed position by the above-described pressure differential.

As shown in FIG. 8, the top shell 94 of the float valve 134 has begun to move downwardly in the fuel tank 12 from the position shown in FIG. 7. This downward movement occurs because liquid fuel 18 sloshing in fuel tank 12 has subsided and the liquid fuel level 20 exposed to the float member 134 has decreased. The second nipple 137 moves in a downward direction along with float member 134. Solid closure member 215 on the second nipple 137 is small enough in size that it typically does not experience any problems in moving to an opened position. As soon as the second nipple 137 moves downwardly with the float member 134 under the force of gravity, solid closure member 215 easy disengages the valve seat 218 to permit some pressurized fuel vapor in the interior region 224 of frame assembly 200 to pass into the inlet of bypass passageway 214 and travel through the venting inlet aperture 86. A portion of the outer surface 212 of the closure member 210 will be exposed to the higher pressure of this pressurized fuel vapor vented through bypass passageway 214. This vented pressurized fuel vapor will act to apply a downward force to the outer surface 212 that is sufficient to assist in moving the first nipple 136 from the seated position shown in FIG. 7 to the unseated position shown in FIGS. 2, 4 and 6.

Figure 9:
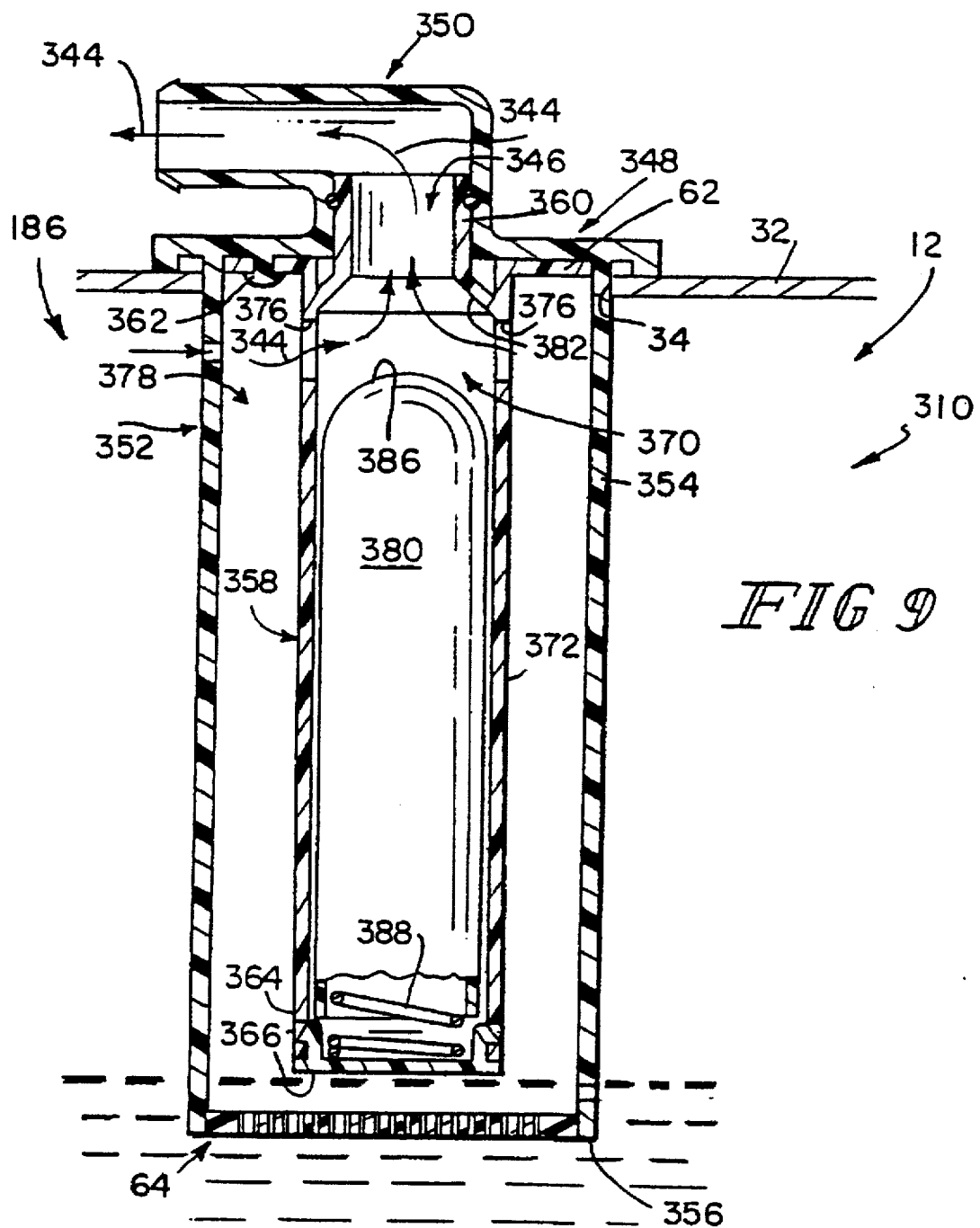
FIG. 9 is an enlarged transverse sectional detail view of another fill-limit tank-ventilation valve assembly mounted to a top wall of the fuel tank and showing tubular skirt surrounding an annular valve housing and carrying a perforated baffle plate and showing venting of fuel vapor from the vapor space in the fuel tank during refueling through a venting outlet opening provided at the top of the valve housing.

An alternative embodiment of a fill-limit and tank-ventilation valve 310 suitable for use with the perforated baffle plate 64 is shown in FIG. 9. The valve 310 may be included in an alternative ORVR system (not shown) and is mounted as shown in a fuel tank 12. Reference is hereby made to U.S. Pat. No. 5,318,069, to Robert S. Harris for a description of a suitable central control valve of a type that could be used in the alternative ORVR system and in combination with the present invention.

As shown in FIG. 9, a vapor space 186 is provided in an upper interior region inside fuel tank 12 between the top wall 32 of the fuel tank 12 and the top surface 20 of the liquid fuel 18 in the fuel tank 12. The fill-limit and tank-ventilation valve 310 is configured to be mounted in the aperture 34 formed in the top wall 32 of the fuel tank 12. This valve 310 is configured to vent fuel vapors 344 extant in vapor space 186 through a vapor outlet opening 346 provided in the top of the fill-limit valve 310. The fill-limit valve 310 includes the baffle plate 64 attached to a skirt 352, and a top wall 348 sized to cover and close the aperture 34 in the fuel tank 12. An L-shaped fuel vapor outlet nozzle 350 is appended to an upper portion of top wall 348.

The tubular skirt 352 is appended to the underside of top wall 348 and arranged to extend through tank outlet opening 34 in a downward direction into vapor space 186 toward the top surface 20 of liquid fuel 18 in the fuel tank 12. The skirt 352 has a side wall 354 having a top end appended to the top wall 348 and an opposite bottom edge 356 appended to the perforated baffle plate 64. Typically, the bottom edge 356 is an endless annular rim that lies in a plane that is situated to lie in spaced-apart parallel relation to a plane defined by the top wall 32 of fuel tank 12. Preferably, the nozzle outlet 350, top wall 348, tubular skirt 352, and baffle plate 64 are molded of plastics material to provide a unitary structure.

As shown in FIG. 9, the fill-limit valve 310 also includes a valve housing 358 that has an upper end 360 sealingly coupled to the L-shaped outlet 350 to define the vapor inlet opening 346. The valve housing 358 has a cylindrical tubular shape although a variety of elongated shapes would be acceptable. The valve housing 358 also includes an annular flange 362 that is positioned to lie inside the tubular skirt 352 in abutting relation to the underside of top wall 348. The valve housing 358 further includes a bottom end 364 positioned to lie in spaced-apart relation from the overlying top end 360 so that the bottom end 364 will be immersed in liquid fuel 18 as the liquid fuel level rises in fuel tank 12 during refueling. As previously described, the baffle plate 64 regulates the rate of flow of liquid fuel 18 through skirt 352 towards valve housing 358.

Valve housing 358 terminates in a bottom closure member 366. A valve chamber 370 is defined in valve housing 358 between an axially extending a side wall 372 of valve housing 358 and the bottom closure member 366. Preferably, the valve housing 358 and the bottom closure member 366 are each molded of a plastics material. This side wall 372 of housing 358 is formed to include a plurality of vapor inlet openings 376. The openings 376 allow fuel vapor from vapor space 186 and pass through an annular channel 378 as shown by arrow 344 to enter into valve chamber 370. Thus fuel vapor may selectively travel through a passageway provided in a top portion of valve chamber 370 and exit valve chamber 370 through venting outlet 346.

Vapor inlet openings 376 are preferably located as far above the liquid fuel level 20 in fuel tank 12 as practicable to minimize carryover of liquid fuel 18 droplets in the venting fuel vapor. Valve housing 358 also includes an upwardly projecting, downwardly facing frustoconical valve seat 382 provided in an upper mounting fixture and formed to include a central aperture defining the venting outlet 346 in the valve housing 358. This valve seat 382 is positioned to lie axially above the plurality of vapor inlet openings 376 provided about the circumference of side wall 372 as shown in FIG. 9.

A float valve 380 is positioned in valve chamber 370 and is free to "float" on liquid fuel 18 received through openings 164 in baffle plate 64 and move toward and away from valve seat 382. Float valve 380 includes a dome-shaped upper cap or tip 386 that is shaped and configured to seat and seal against the frustoconical valve seat 382 and block fuel vapor flow through the venting outlet 346 into the discharge conduit 350 in response to sufficient upward movement of float valve 380 in valve chamber 370 during rising fuel levels in fuel tank 12 created by refueling.

A compression spring 388 acts between bottom closure member 366 and the float valve 380 to assist in lifting the float valve 380 within the valve chamber 370 as the fuel level 20 therein rises during refueling. Illustratively, the spring 388 is situated to lie inside valve housing 358 in a position underneath the float valve 380.

The baffle plate 64, as previously described, is typically snap-fit onto the bottom edge 356 of the skirt 352. The plate 64 permits the controlled flow of liquid fuel 18 into the channel 378, but prevents liquid fuel 18 from suddenly and sporadically rising therein. Therefore, the float valve 380 does not prematurely shut when liquid fuel 18 makes a single splash into the skirt 352. The baffle plate 64 is well-suited for use with a variety of fill-limit and tank-ventilation valves 10, 310.

Figure 10:
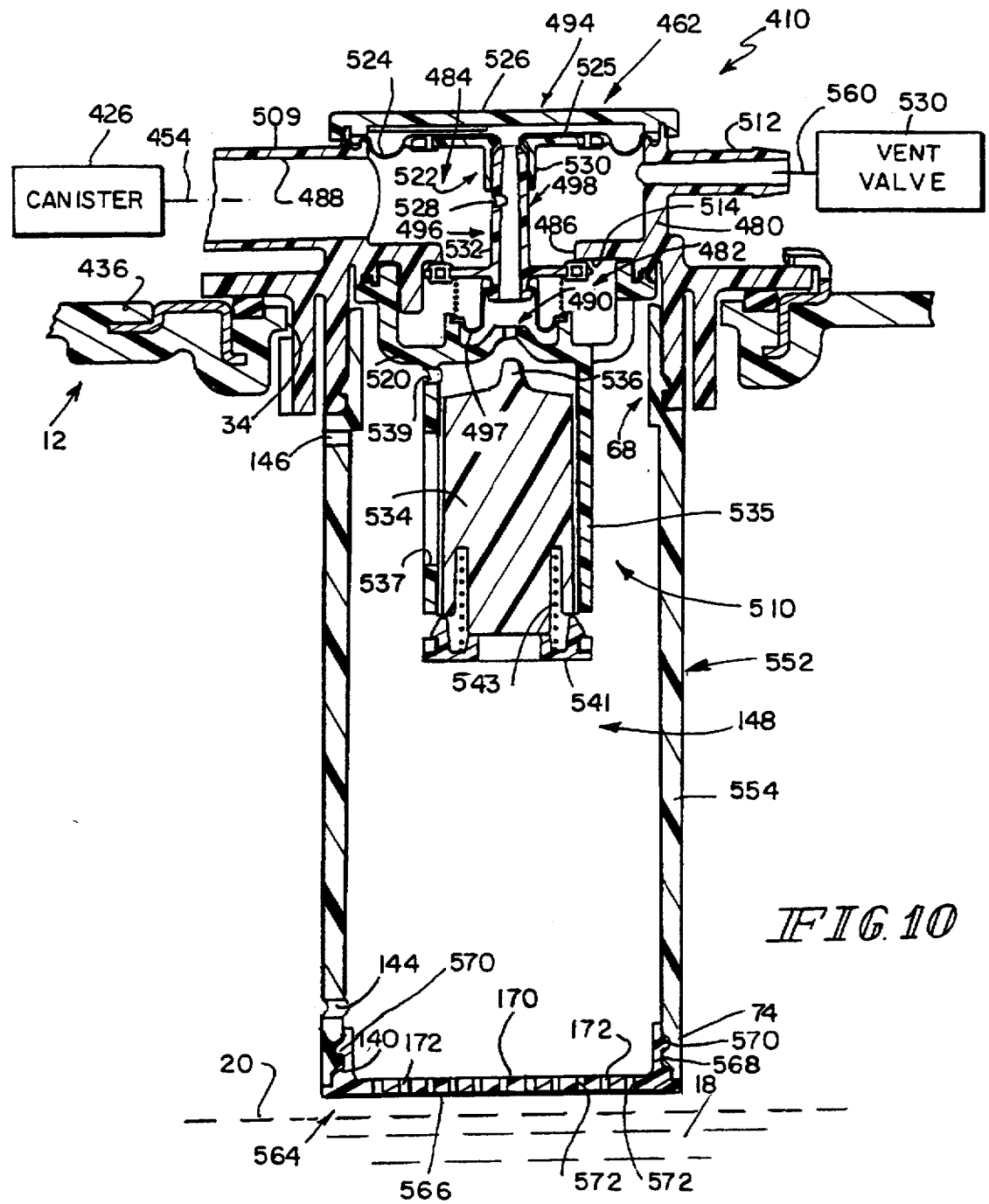
FIG. 10 is a sectional detail view of yet another fill-limit tank-ventilation valve assembly including a tubular skirt carrying a perforated baffle plate and showing the fill-limit tank ventilation valve assembly in a static condition at low fuel level in the fuel tank when no venting is occurring showing use of an auxiliary pressure-relief valve to vent pressurized fuel vapor from the fuel tank to the atmosphere.

An alternative embodiment of a fill-limit and tank-ventilation valve 410 in a fuel tank 12 is shown in FIG. 10. Illustratively, fill-limit and tank-ventilation valve 410 is mounted in an aperture 434 formed in an upper tier portion 436 of tank top wall 32. Fill-limit valve 410 includes a vent apparatus 462, the baffle plate 64, and rollover valve assembly 510 therebetween. The vent apparatus 462 has a valve housing 480 containing a pressure/vacuum-relief valve assembly 482 in a passageway 484 formed in housing 480. Housing 480 is formed to include a vapor inlet opening 486 and a vapor outlet opening 488 interconnected in fluid communication by passageway 484. Reference is hereby made to U.S. Pat. No. 5,234,013 to Roetker et al., which patent is hereby incorporated by reference herein, for a detailed description of a suitable tank venting control assembly for use in vent apparatus 462.

Vent apparatus 462 is provided for controlling venting of fuel vapor through aperture 434 in fuel tank 12. Vent apparatus 462 is connected via a tube 454 to a fuel vapor treatment device 426. Vent apparatus 462 comprises the housing 480 mounted in the aperture 335 and the valve 482 movable in the housing 480 between a blocking position preventing fuel vapor flow from the fuel tank 12 through the housing 480 and a venting position allowing fuel vapor flow from the fuel tank 12 through the housing 480. A spring 492 biases the valve 482 upwardly towards its blocking position as shown in FIG. 10. A vent actuator mechanism of the type disclosed in the Roetker et al. '013 patent is provided for using fuel vapor from the fuel tank 12 to move the valve 482 against the spring 492 towards a venting position (not shown). The vent actuator mechanism includes a venting control chamber 494 receiving pressurized fuel vapor from the fuel tank 12 in an extensible conduit 496 communicating fuel vapor from the fuel tank 12 to the venting control chamber 494. Vent apparatus 462 further includes a flexible partition 499 extending between the valve 482 and the extensible conduct 496 to provide a barrier to prevent fuel vapor venting through the housing 480 from entering an intermediate passageway portion 490 to vary the pressure therein.

Valve housing 480 of vent apparatus 462 is formed to include a hollow interior that is divided into a lower chamber 489 housing the rollover valve assembly 510, and an upper chamber 491 including the inner portion housing valve 482 and an outer portion defined by passageway 484. Valve housing 480 is formed to include a first outlet 509 defining vapor outlet opening 488 and a second outlet (not shown) at a right angle to the first outlet 509. First outlet 509 is coupled to vapor-recovery canister 426 and second outlet (not shown) discharges excess fuel vapor to atmosphere. Valve housing 480 also includes an inlet 512 for communicating pressurized fuel vapor discharged from run-loss valve 530 through tube 560 in the upper chamber 491 in valve housing 480. Valve housing 480 is thus a part of two vent paths for pressurized fuel vapor being discharged from fuel tank 12 to vapor-recovery canister 426. Pressurized fuel vapor can pass from fuel tank 12 to vapor-recovery canister 426 along a path through openings 164 in baffle plate 64 and through vapor inlet opening 486 in valve housing 480 or along another path through inlet 512 in valve housing 480.

Valve 482 in vent apparatus 462 is movable between a blocking position and a venting position in response to fuel vapor pressure changes in fuel tank 12. When in its blocking position, valve 482 seats against a valve seat 514 to block pressurized fuel vapor flow from the interior region of fuel tank 412 to vapor-recovery canister 426 through vapor inlet opening 486 in valve housing 480. When moved away from valve seat 514 to its venting position, valve 482 allows flow of pressurized fuel vapor from fuel tank 12 through vapor inlet opening 486. Spring 492 acts between a flow shield 520 and valve 482 to normally to bias valve 482 toward its blocking position.

Valve actuator 522 is provided to move valve 482 from its blocking position against spring 492 to its venting position when fuel vapor pressure in fuel tank 12 exceeds a predetermined level. Pressurized fuel vapor from fuel tank 12 is corralled in venting control chamber 494 used to depress valve actuator 522, which in turn urges valve 482 downwardly in the manner described below toward its venting position.

Valve actuator 522 includes a round diaphragm 524 or other suitable resilient sealing material having its peripheral edge mounted inside housing 480 as shown in FIG. 10. Diaphragm 524 cooperates with valve housing cover 526 to define venting control chamber 494. Chamber 494 receives and uses a pressurized fuel vapor signal from the interior region of fuel tank 42 to apply a downwardly directed force against diaphragm 524. The extensible conduit 496 is formed to connect venting control chamber 494 in fluid communication with vapor outlet opening 488. Thus, pressurized fuel vapor accumulating in venting control chamber 494 eventually dissipates to vapor outlet opening 488 formed in valve housing 480 and is conducted onto vapor-recovery canister 426.

Diaphragm 524 is movable inside housing 480 in response to an accumulation of fuel vapor pressure in venting control chamber 494. Diaphragm 524 is movable between a static position (shown in FIG. 10) allowing valve 482 to remain in its blocking position seated against valve seat 514 and an actuating position urging valve 482 away from seat 514 against the bias of spring 492 toward its venting position.

Vent apparatus 462 is provided with a rollover valve assembly 510. Although any of a number of designs may be used, the rollover valve assembly 510 includes a spring-biased float valve 534 or other liquid discriminator inside a tubular valve housing 535 as shown in FIG. 10. Float valve 534 includes a nipple 536 arranged and sized to block the flow of pressurized fuel vapor and also liquid fuel through the partition 520. Valve housing 535 is a tubular member depending partition 520 and is formed to include a tall lower inlet opening 537 and a small upper inlet opening 539. A bottom plate 541 is fixed to the distal end of valve housing 535 and a compression spring 543 is placed in valve housing 535 to act against float valve 534 and bottom plate 541. Spring 543 assists in raising float valve 534 toward its closed position.

Skirt 552 is tubular in shape and formed for attachment with valve housing 480 and an alternative baffle plate 564. The perforated baffle plate 564 includes a bottom wall 566 and a rim 568 extending about the circumference of the wall 566. The rim 568 includes a locking flanges 570 extending outwardly therefrom for locking engagement with the skirt 552. As previously described, openings 572 extend through the bottom wall 566. These openings 572 permit limited controlled flow of liquid fuel 18 therethrough, but substantially block the rapid sporadic splashing into the skirt 552 having a side wall 554. The baffle plate 564 substantially prevents the rapid and sporadic flow of liquid fuel into the therethrough. Thus, referring now to FIGS. 2, 8, and 10 it is apparent that the baffle plate 64 may be used in conjunction with a wide variety of fill-limit and tank-ventilation assemblies. Such interchangeability will reduce manufacturing costs by minimizing the need to keep various fill-limit valve assembly systems on hand.

Also aiding interchangeability of the skirt 66 are the connectors 68 on the vent apparatus 62 and corresponding connector portions 69 on said skirt 66. The fill-limit and tank-ventilation valve 10 according to the present invention is shown in FIG. 11. The ventilation valve 10 is shown as it would appear to a worker before the worker installs said valve 10 in the fuel tank 12. The tank-ventilation valve 10 includes the vent apparatus 62 and the tubular skirt 66 formed for attachment on the vent apparatus 62. The vent apparatus 62 and tubular skirt 66 are held securely together without the need for welding or a multi-part connection apparatus including nuts, bolts, or the like.

The lower chamber 89 of valve housing 80 is defined by a cylindrical wall 36 having an upper end 38 engaging the partition 138 and an opposite lower end 40. This lower end 40 has a notch 42 that extends about its periphery and that is sized to receive and retain an o-ring 44 therein. See FIGS. 11 and 12. Connectors 68 are positioned in a spaced-apart relationship about the circumference of cylindrical wall 36 adjacent the upper end 38. The valve housing 80 includes four connectors 68 extending radially outwardly therefrom. These connectors 68 are formed as rectangular shaped tabs. The present invention, however, contemplates that different shaped connectors 68 may be used. Tubular skirt 66 includes an upper lip 46 extending about the circumference of the uppermost end 70. The cylindrical wall 36 of the valve housing 80 extends through the upper lip 46 as shown, for example in FIG. 1.

Referring now to FIG. 11, the skirt 66 has four connector portions 69 formed therein. The connector portions 69 are positioned adjacent the uppermost end 70 of said skirt 66. Moreover, the connector portions 69 are aligned with and sized to receive the respective connectors 68 therein. Each connector portion 69 includes a notch inlet 118 extending through the upper lip 46, a sliding passageway 120 positioned generally parallel to the upper lip 46, and a locking portion 122. As best shown in FIG. 12, the sliding passageway 120 and locking portion 122 are joined by a ramp 124 extending therebetween. This ramp 124 is slanted from the sliding passageway 120 toward the upper lip 46. The connector portion 69 further includes a locking unit 126. This locking unit 126 includes a mounting portion 128 and a living spring 130 extending from the mounting portion 128 toward the ramp 124. The locking unit 126 as it would appear in the connector-disengaging position is shown in FIGS. 12 and 14.

To mount the vent apparatus 62 on the tubular skirt 66, each connector 68 is aligned with the notch inlet 118 of the respective connector portion 69. Referring now to FIG. 12, the skirt 66 is pressed, as shown by arrow 132, toward the valve housing 80. This pressing continues until the lower chamber 89 is situated within the skirt 66 and the partition 138 engages the uppermost end 70 of said skirt 66. At that time, the connector 68 is situated within the notch inlet 118 of the tubular skirt 66.

Referring now to FIG. 13, the skirt 66 is rotated, as shown by arrow 133, relative to the vent apparatus 62. This rotation moves the connector 68 away from the notch inlet 118, through the sliding passageway 120, and into engagement with the living spring 130. Once the connector 68 enters the sliding passageway 120, it engages and loads the living spring 130. As the skirt 66 continues to rotate in the direction of arrow 133, the connector 68 slides up the ramp 124 and into the locking portion 122.

At this time, the connector 68 disengages the living spring 130. Thus, the living spring 130 unloads and returns to its connector-disengaging position, as shown, for example in FIG. 14. Once in this connector-disengaging position, the living spring 130 blocks sliding movement of the connector 68 down the ramp 124 and into the sliding passageway 120. Thus, the connectors 68 and the connector portions 69 of the skirt 66 act to hold the vent apparatus 62 on the tubular skirt 66.

In an embodiment of the invention, the tubular skirt 66 includes a plurality of drivers 72 positioned in a spaced-apart relationship about its circumference. These drivers 72 are grasped either by stationed conveyor assembly (not shown) or by a hand-activated assembly (not shown) to aid in assembly of valve 10. The present invention contemplates that various assembly mechanisms may be used to press 132 and rotate 133 the skirt 66 into a locked engagement with the vent apparatus 62. It is also contemplated that the vent apparatus may be pressed and rotated into engagement with the skirt 66.

Although the invention has been described in detail with reference to certain preferred embodiments, variations and modifications exists within the scope and spirit of the invention as described and defined in the following claims.

What is claimed is:

1. An apparatus for controlling discharge of fuel vapor from a vehicle fuel tank, the apparatus comprising, a valve housing adapted to be mounted in a top wall of the fuel tank, the valve housing being formed to include a vapor-inlet opening adapted for communicating with an interior region of the fuel tank, a vapor-outlet opening, and a passageway interconnecting the vapor-inlet opening and the vapor-outlet opening, a float valve disposed in the valve housing and movable between an open position allowing flow of fuel vapor through the vapor-inlet opening and a closed position preventing flow of fuel vapor through the vapor-inlet opening, a skirt extending around the valve housing and the vapor-inlet opening in the valve housing to define an annular channel lying around the float valve, the skirt having a skirt inlet adapted to lie in spaced-apart relation to the vapor-inlet opening in the valve housing, and a perforated baffle plate coupled to the skirt and positioned to lie adjacent the skirt inlet, the baffle plate being formed to include a plurality of openings therethrough.

2. The apparatus of claim 1, wherein the openings in the perforated baffle plate are positioned in a concentric spaced-apart relationship relative to one another.

3. The apparatus of claim 2, wherein the openings have an average diameter of about 0.05 to about 0.150 inches.

4. The apparatus of claim 1, wherein the skirt includes a side wall formed to include an aperture configured to communicate fuel vapor into the channel, the aperture being positioned to lie between the perforated baffle plate and the float valve in coextensive relation with a top surface of liquid fuel in the fuel tank equal to a predetermined maximum fuel capacity of the fuel tank.

5. The apparatus of claim 4, wherein the side wall of the skirt includes a lowermost end and the perforated baffle plate is formed for attachment to the lowermost end.

6. The apparatus of claim 5, wherein the perforated baffle plate includes a bottom wall and a rim extending about the circumference of the bottom wall and the rim is sized to snap-fit about the circumference of the lowermost end of the annular wall.

7. The apparatus of claim 1, further comprising a float-valve housing coupled to the skirt, the float-valve housing including a solid bottom plate supporting the float valve and a cylindrical portion surrounding the float valve.

8. The apparatus of claim 7, wherein the cylindrical portion is formed to include vent openings therethrough and the vent openings extend through the cylindrical portion in the upper 75% of said portion.

9. A venting control system for a fuel tank, the system comprising a vent apparatus configured to be coupled to the fuel tank, the vent apparatus being formed to include a vapor-inlet opening configured for communicating with an interior region of the fuel tank, a vapor-outlet opening, and a passageway interconnecting the vapor-inlet opening and the vapor-outlet opening, a skirt extending around the vapor-inlet opening in the vent apparatus to define a channel, the skirt being formed to include a skirt inlet for admitting fuel vapor into the channel, a rollover float valve mounted within the skirt and formed for movable engagement with the vent apparatus, and a perforated baffle plate coupled to the skirt and positioned to lie adjacent to the skirt inlet, the perforated baffle plate including a plurality of openings therethrough allowing flow of fuel vapor into the channel through the skirt inlet and substantially reducing the flow of liquid fuel into the channel through the skirt inlet.

10. The system of claim 9, wherein the skirt includes side wall formed to include an aperture configured to communicate fuel vapor into the channel and positioned to lie between the vent apparatus and the perforated baffle plate.

11. The system of claim 10, wherein the skirt includes a lowermost end, an opposite uppermost end, and a mounting section positioned at the lowermost end and the perforated baffle plate includes a bottom wall and a rim extending about the circumference of the bottom wall and the rim is configured to snap onto and engage the mounting section to establish a fixed position of the bottom wall of the perforated baffle plate.

12. The system of claim 11, wherein the skirt further includes snap-connectors positioned at the uppermost end and configured to engage the vent apparatus to establish a fixed position of the skirt under the vapor-inlet opening of the vent apparatus.

13. The system of claim 11, wherein the skirt includes a side wall formed to include a lowermost end, an opposite uppermost end, and a lower vent aperture configured to communicate fuel vapor into the channel and positioned to lie between the lowermost end of the skirt and the float valve in coextensive relation with a top surface of liquid fuel in the fuel tank equal to a predetermined maximum fuel capacity of the fuel tank.

14. The system of claim 13, wherein the uppermost end of the side wall is coupled to the vent apparatus and formed to include an upper vent aperture configured to vent fuel vapor into and out of the channel and positioned to lie in horizontally spaced-apart relation to the float valve.

15. An apparatus for controlling discharge of fuel vapor from within a vehicle fuel tank, the apparatus comprising a valve housing adapted to be mounted in a top wall of the fuel tank, the valve housing being formed to include a vapor-inlet opening adapted for communicating with an interior region of the fuel tank, a vapor-outlet opening, and a passageway interconnecting the vapor-inlet opening and the vapor-outlet opening, a valve disposed in the valve housing and movable between an opened position allowing flow of fuel vapor through the vapor-outlet opening and a closed position preventing flow of fuel vapor through the vapor-outlet opening, a skirt adapted to be positioned to lie inside the fuel tank and extending around the valve housing and the vapor-inlet opening in the valve housing to define a channel lying around the valve housing and adapted to conduct fuel vapor from the interior region of the fuel tank to the vapor-inlet opening, the skirt having a lowermost end adapted to lie in spaced-apart relation to the top wall of the fuel tank and the vapor-inlet opening in the valve housing being adapted to be located in a position between the top wall of the fuel tank and the lowermost end of the skirt, the lowermost end of the skirt being positioned to lie in coextensive relation with a top surface of liquid fuel in the interior region of the fuel tank is equal to a predetermined fuel capacity of the fuel tank, and a perforated baffle plate coupled to the skirt to lie adjacent to the lowermost end of the skirt, the perforated baffle plate including a bottom wall having openings therethrough, the openings being sized to allow flow of fuel vapor from the interior region of the fuel tank into the channel and substantially regulating flow of liquid fuel from the interior region of the fuel tank into the channel.

16. The apparatus of claim 15, wherein the valve housing further includes a partition adapted to be coupled to the top wall of the fuel tank and the skirt includes side wall coupled to the partition of the valve housing and positioned to surround the float-valve housing and define the channel therebetween.

17. The apparatus of claim 16, wherein the skirt includes a snap-connector formed for secure engagement with the valve housing.

18. The apparatus of claim 16, wherein the annular side wall further includes an uppermost end adjacent opposite the lowermost end and the top wall, and the apparatus further comprises a snap-connector coupled to the uppermost end and the valve housing.

19. The apparatus of claim 18, wherein the lowermost end defines an inlet formed in the skirt.

20. The apparatus of claim 15, wherein the float valve includes a tip engaging the valve housing upon movement of the float valve to the closed position and further comprising spring means for assisting in moving the float valve toward the closed position as liquid fuel in the fuel tank rises above a predetermined level.

21. The apparatus of claim 20, wherein the skirt is coupled to the valve housing and includes a side wall appended to the top wall and positioned to surround the valve housing and define the channel therebetween.

22. An apparatus for controlling discharge of fuel vapor from a vehicle fuel tank having a filler neck for receiving a fuel-dispensing nozzle therein, the apparatus comprising
means for venting fuel vapor from a vapor space in the fuel tank above liquid fuel contained in the fuel tank to an outside space,
primary shut-off means for using rising liquid fuel in the fuel tank introduced into the fuel tank during refueling to block fuel vapor in the vapor space in the fuel tank from entering the venting means, the primary shut-off means including a skirt extending downwardly from the venting means and a perforated baffle plate coupled to the skirt and positioned in the tank in a spaced-apart relation to the venting means and formed to include means for substantially blocking the flow of liquid fuel through the skirt toward the venting means, and
secondary shut-off means for blocking flow of fuel vapor from the fuel tank through the venting means, the secondary shut-off means including a valve housing coupled to both the venting means and the skirt and being formed to include a vapor-inlet opening receiving fuel vapor from the fuel tank and a passageway interconnecting the vapor-inlet opening and the venting means, the secondary shut-off means further including a float valve extending between the valve housing and the skirt and movable between an open position allowing flow of fuel vapor through the venting means and a closed position preventing flow of fuel vapor through the venting means.

23. The apparatus of claim 22, wherein the venting means includes a fixture mounted in a wall of the fuel tank and formed to include a vapor-outlet opening communicating with the vapor-inlet opening formed in the valve housing and the skirt is configured to conduct fuel vapor from the vapor space in the fuel tank to the vapor-inlet opening in the valve housing.

24. The apparatus of claim 23, wherein the skirt is formed to include a channel communicating fuel vapor from the vapor space to the vapor-inlet opening and a portion of the valve housing lies in the channel.

25. The apparatus of claim 23, wherein the primary shut-off means further includes means for mounting the skirt in a fixed position relative to the valve housing, the skirt includes a top end adjacent to the vapor-outlet opening and an opposite bottom end, and the mounting means interconnects the top end of the tubular member and the top end of the valve housing.

26. The apparatus of claim 23, wherein the openings in the perforated baffle plate are positioned in a concentric spaced-apart relationship relative to one another.

27. The apparatus of claim 26, wherein the openings have an average diameter of about 0.05 to about 0.150 inches.

28. The apparatus of claim 23, wherein the skirt includes a side wall formed to include an aperture configured to communicate fuel vapor into the channel, the aperture being positioned to lie between the perforated baffle plate and the float valve in coextensive relation with a top surface of liquid fuel in the fuel tank equal to a predetermined maximum fuel capacity of the fuel tank.

29. The apparatus of claim 28, wherein the side wall of the skirt includes a lowermost end and the perforated baffle plate is formed for attachment to the lowermost end.

30. The apparatus of claim 29, wherein the perforated baffle plate includes a bottom wall and a rim extending about the circumference of the bottom wall and the rim is sized to snap-fit about the circumference of the lowermost end of the annular wall.

31. An apparatus for controlling discharge of fuel vapor from an interior region of a vehicle fuel tank and preventing unsatisfactory liquid fill levels within the interior region of said vehicle fuel tank, the apparatus comprising
a housing adapted to be mounted in a top wall of the vehicle fuel tank, the housing being formed to include a housing inlet, a vapor-outlet opening, a valve seat positioned to lie between the housing inlet and the vapor-outlet opening and formed to define a vapor-inlet opening adapted for communicating with the interior region of the vehicle fuel tank, and a wall defining a reduced pressure zone between the valve seat and the housing inlet,
a float valve disposed in the housing and movable between an open position allowing flow of fuel vapor through the vapor-outlet opening and a closed position preventing flow of fuel vapor through the vapor-outlet opening, the float valve including a bottom and an opposite closure member configured to selectively engage the valve seat,
a skirt having a skirt inlet spaced apart from the vapor-inlet opening in the housing and a skirt wall extending from the skirt inlet, the skirt wall being coupled to the housing and positioned to extend around the valve,
a perforated baffle plate being coupled to the skirt and formed to include a plurality of openings therethrough, and
a valve housing being coupled to the skirt and including a bottom plate and a housing wall surrounding the float valve, the valve housing being positioned to lie within the skirt and define an intermediate pressure zone between the skirt inlet and the housing inlet so that the bottom of the float valve is exposed to fuel vapor present within the intermediate pressure zone and the closure member is exposed to fuel vapor present within the reduced pressure zone, and wherein the reduced pressure zone is at a pressure depression level that is a summation of the losses in vapor pressure as the fuel vapor flows from the interior region of the vehicle fuel tank through the intermediate pressure zone and into the reduced pressure zone.

32. The apparatus of claim 31, wherein a plurality of vent openings extend through the housing wall in spaced-apart relation to one another.

33. The apparatus of claim 32, wherein the vent openings are positioned to lie in an upper 75% of the housing wall.

34. The apparatus of claim 32, wherein the bottom plate supports the bottom of the float valve.

35. The apparatus of claim 32, wherein the bottom plate is solid.

36. The apparatus of claim 31, wherein the skirt wall includes a lowermost end, an opposite uppermost end, and a lower vent aperture configured to communicate fuel vapor into the channel and positioned to lie between the lowermost end of the skirt and the float valve in coextensive relation with a top surface of liquid fuel in the fuel tank equal to a predetermined maximum fuel capacity of the fuel tank.

37. An apparatus for controlling discharge of fuel vapor from an interior region of a vehicle fuel tank and preventing unsatisfactory liquid fill levels within the interior region of said vehicle fuel tank, the apparatus comprising

- a housing adapted to be mounted in a top wall of the vehicle fuel tank, the housing being formed to include a housing inlet, a vapor-outlet opening, a valve seat positioned to lie between the housing inlet and the vapor-outlet opening and formed to define a vapor-inlet opening adapted for communicating with the interior region of the vehicle fuel tank, and a wall defining a passageway interconnecting the valve seat and the housing inlet,
- a float valve including a closure member configured to selectively engage the valve seat and an opposite bottom,
- a skirt having a skirt inlet spaced apart from the vapor-inlet opening in the housing and a skirt wall extending from the skirt inlet, the skirt wall being coupled to the housing and positioned to extend around the float valve,
- a baffle plate being coupled to the skirt, and
- a valve housing coupled to the skirt, the valve housing including a bottom plate and a housing wall surrounding the valve, the valve housing being formed to include a plurality of vent openings therethrough in spaced-apart relation to one another.

38. The apparatus of claim 37, wherein the vent openings are positioned to lie in an upper 75% of the housing wall.

39. The apparatus of claim 37, wherein the baffle plate is positioned to lie adjacent the skirt inlet and formed to include a plurality of openings therethrough.

40. The apparatus of claim 39, wherein the skirt wall includes a lowermost end, an opposite uppermost end, and a lower vent aperture positioned to lie between the lowermost end of the skirt and the valve in coextensive relation with a top surface of liquid fuel in the fuel tank equal to a predetermined maximum fuel capacity of the fuel tank.

41. An apparatus for controlling discharge of fuel vapor from a vehicle fuel tank, the apparatus comprising,

- a housing adapted to be mounted in a top wall of the vehicle fuel tank, the housing being formed to include a vapor-inlet opening adapted for communicating with an interior region of the vehicle fuel tank, a vapor-outlet opening, and a passageway interconnecting the vapor-inlet opening and the vapor-outlet opening,
- a float valve disposed in the housing and movable between an open position allowing flow of fuel vapor through the vapor-inlet opening and a closed position preventing flow of fuel vapor through the vapor-inlet opening,
- a skirt coupled to the housing to define a channel adjacent to the float valve, the skirt having a skirt inlet adapted to lie in spaced-apart relation to the vapor-inlet opening in the valve housing, and
- a perforated baffle plate coupled to the skirt and positioned to lie adjacent the skirt inlet, the baffle plate being formed to include a plurality of openings therethrough.

42. The apparatus of claim 41, wherein the openings in the perforated baffle plate are positioned in a concentric spaced-apart relationship relative to one another.

43. The apparatus of claim 41, wherein the openings in the perforated baffle plate have an average diameter of about 0.05 to about 0.150 inches.

* * * * *